Feb. 16, 1943.    G. MAURER    2,311,452
CHARGING DEVICE
Filed April 1, 1942    17 Sheets-Sheet 1

Inventor G. Maurer

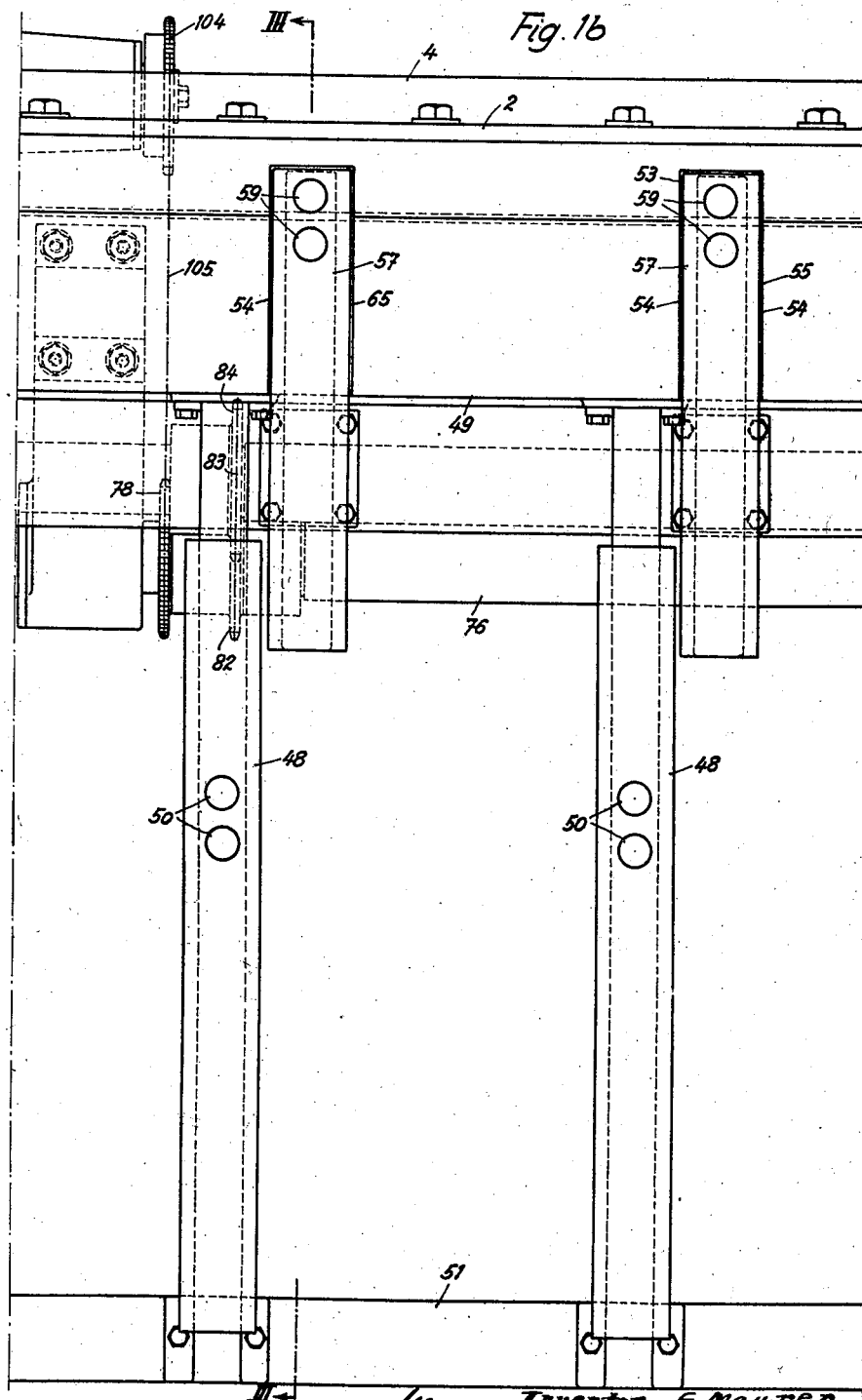

Feb. 16, 1943.  G. MAURER  2,311,452
CHARGING DEVICE
Filed April 1, 1942   17 Sheets-Sheet 3

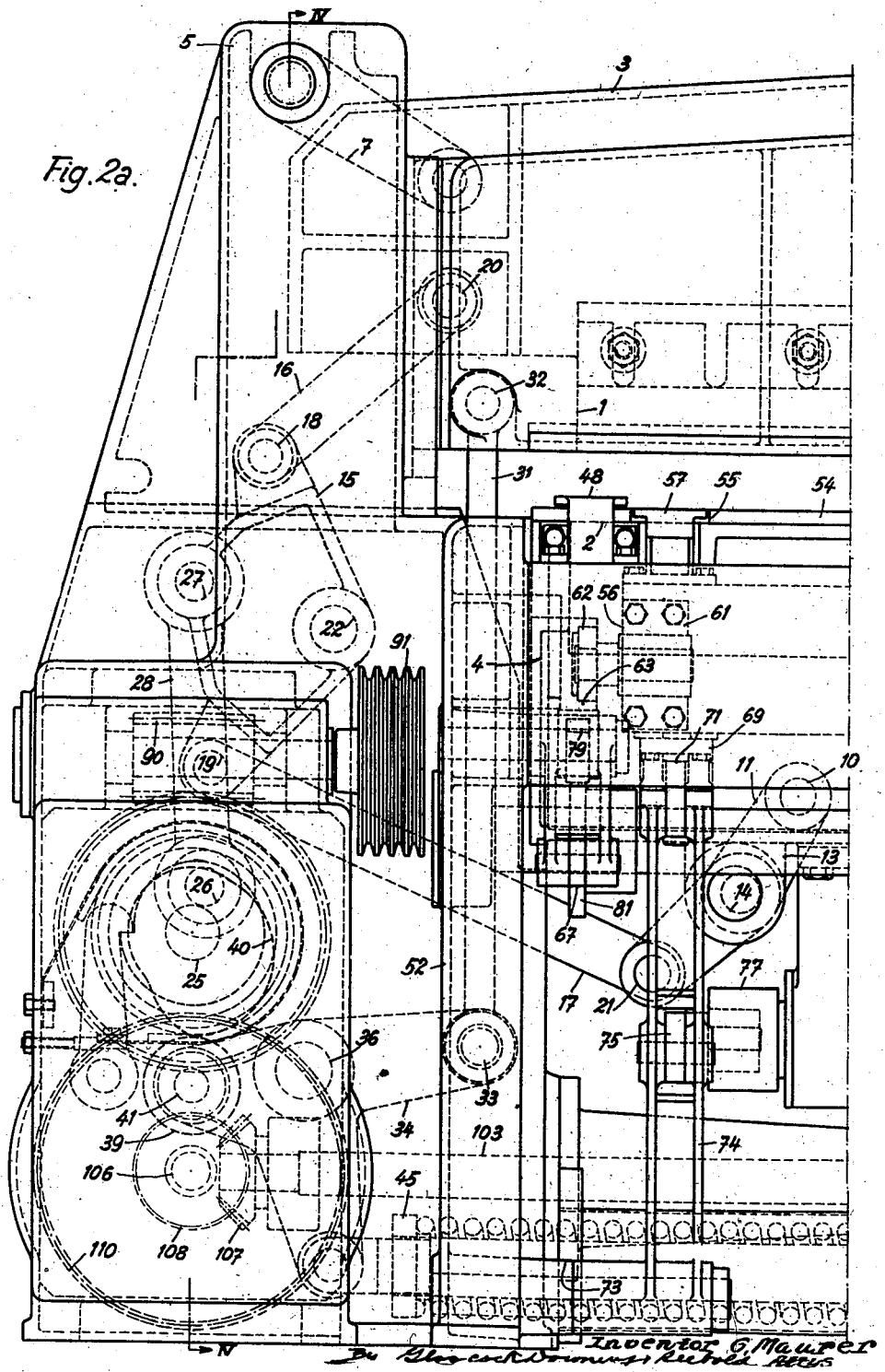

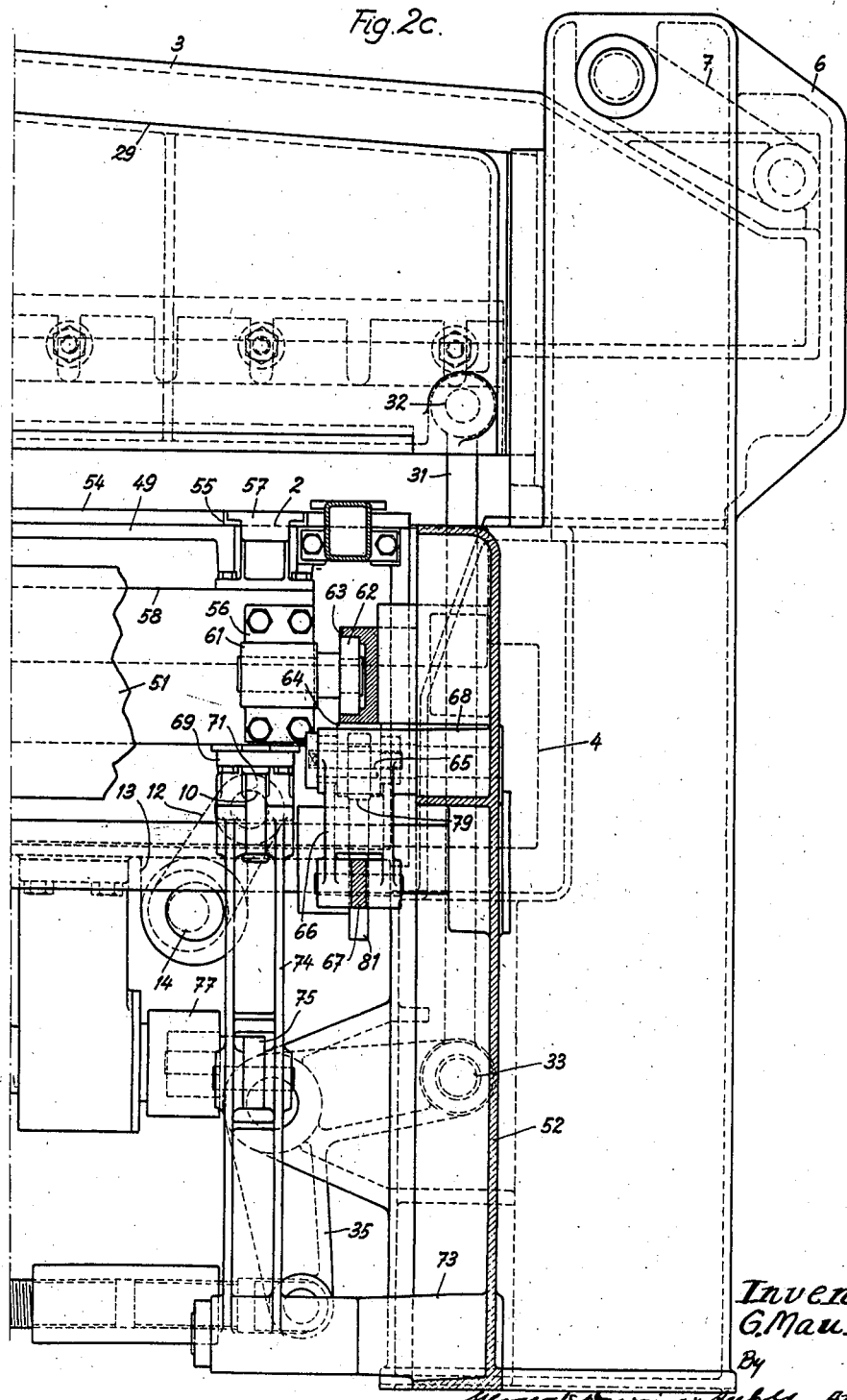

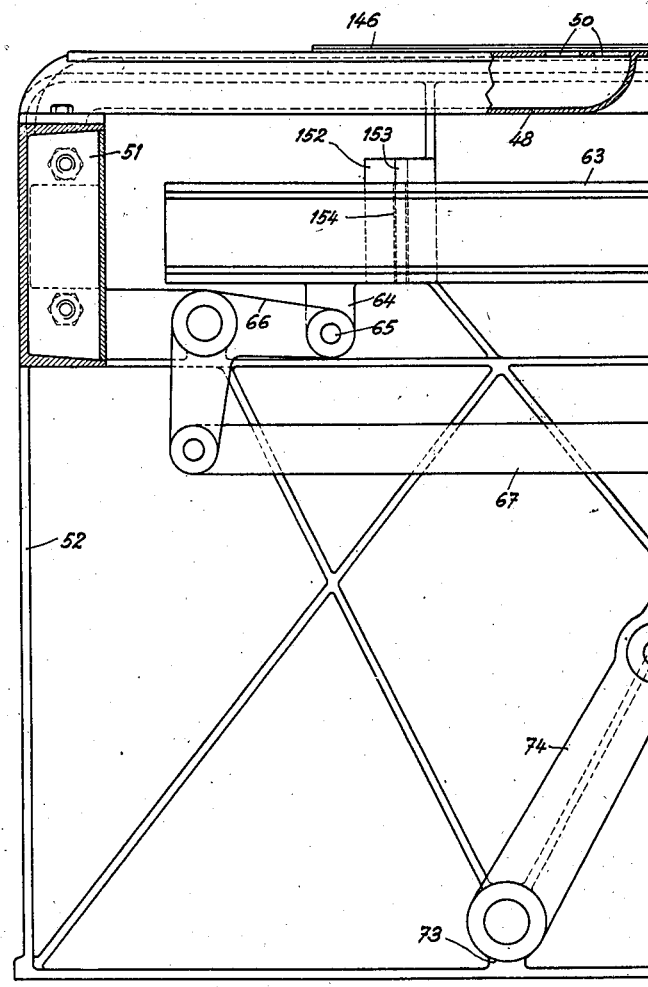

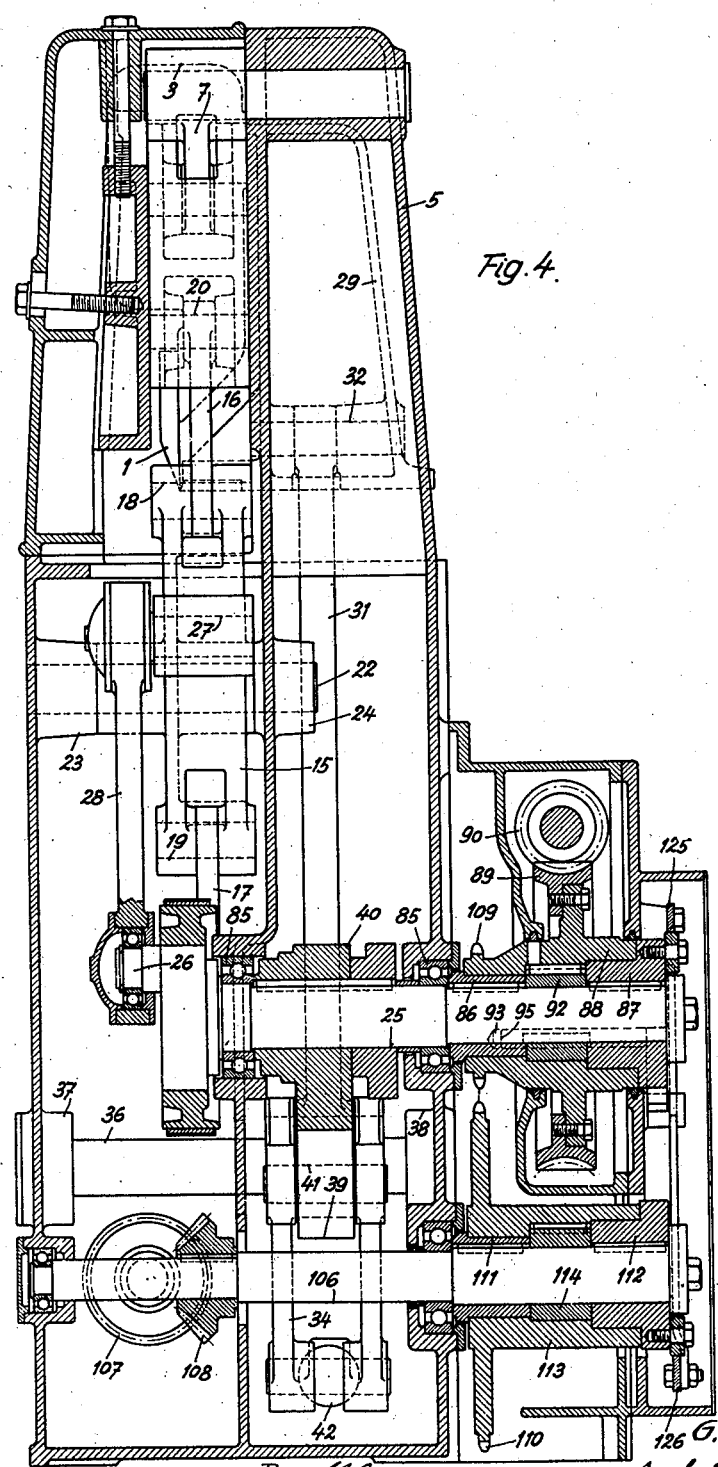

Feb. 16, 1943.  G. MAURER  2,311,452
CHARGING DEVICE
Filed April 1, 1942  17 Sheets-Sheet 10

Inventor
G. Maurer
By Glascock Downing & Seebold
Attys.

Feb. 16, 1943.   G. MAURER   2,311,452
CHARGING DEVICE
Filed April 1, 1942    17 Sheets-Sheet 11

Inventor
G. Maurer
By Haseltine Downing Achole
Attys

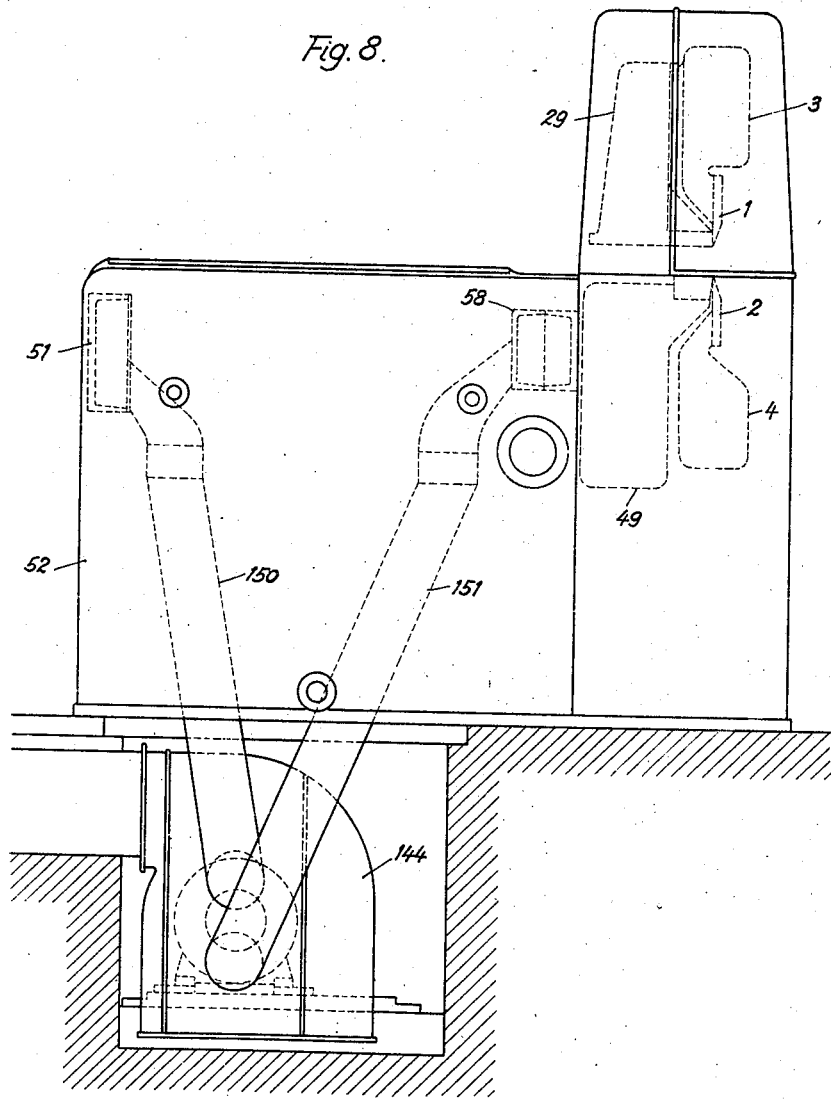

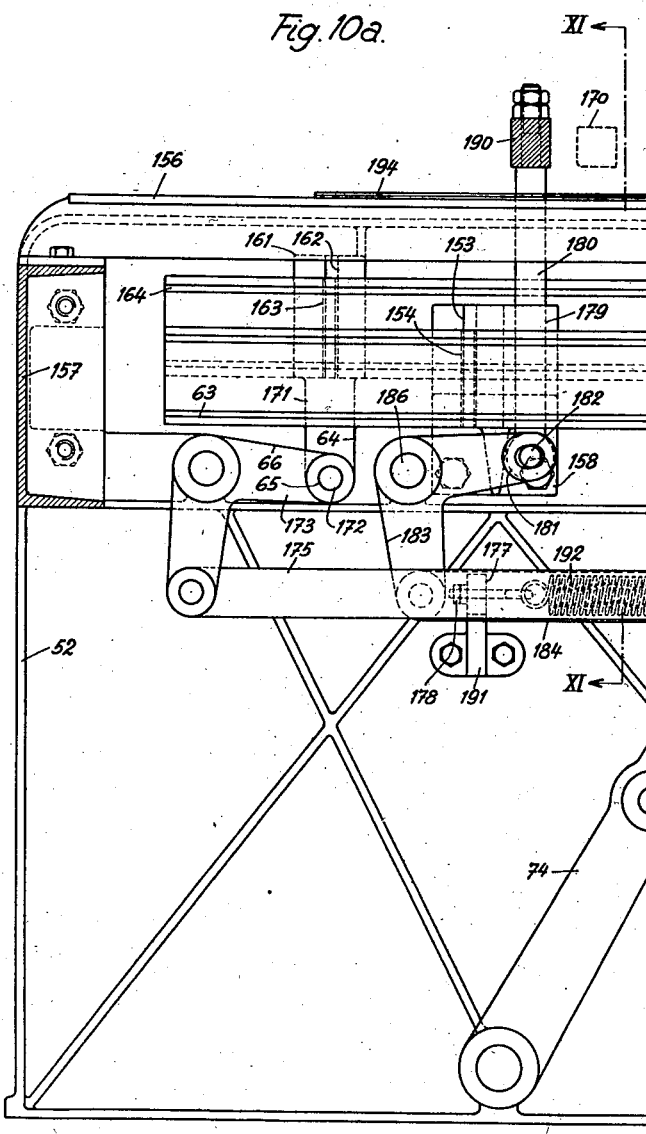

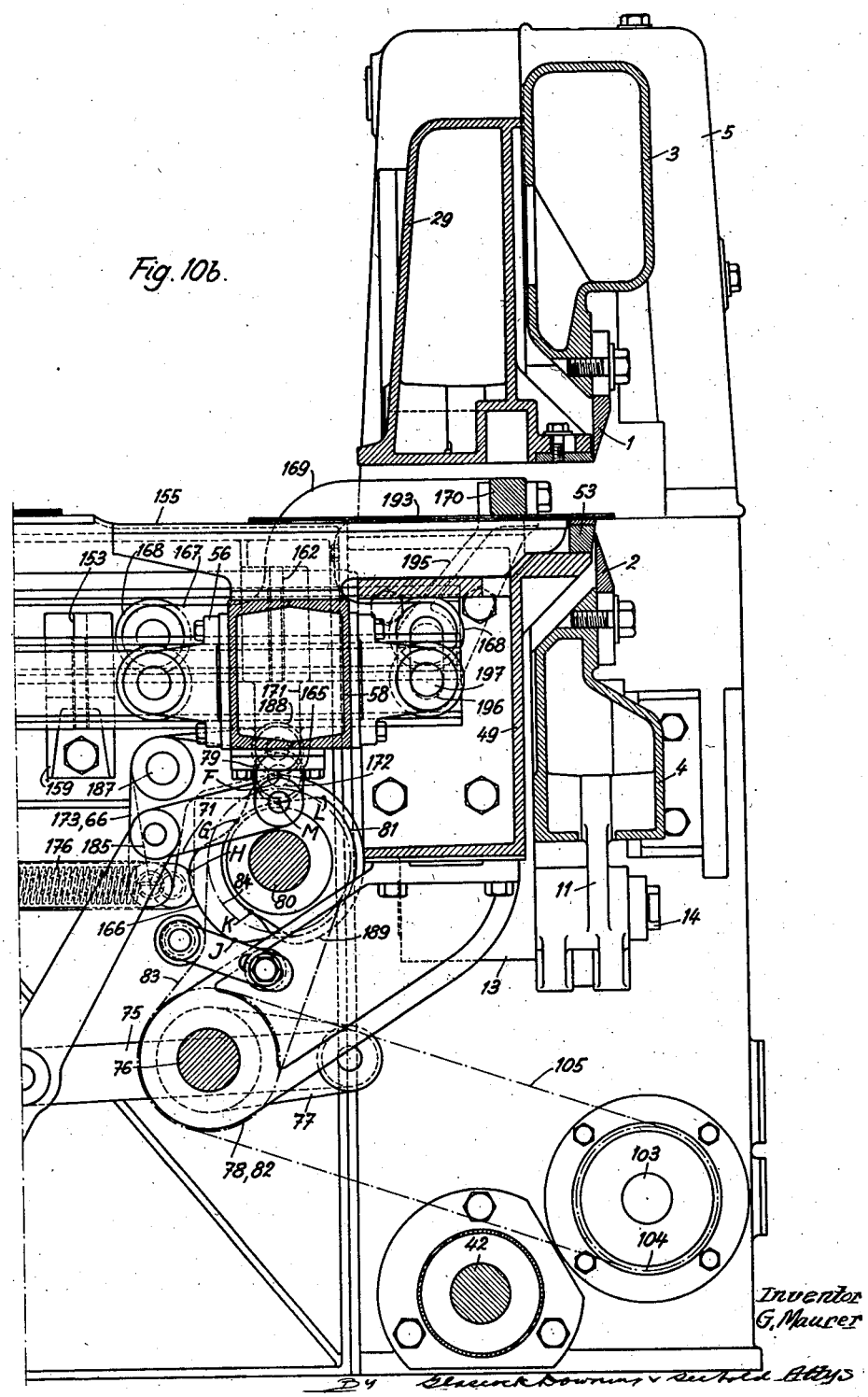

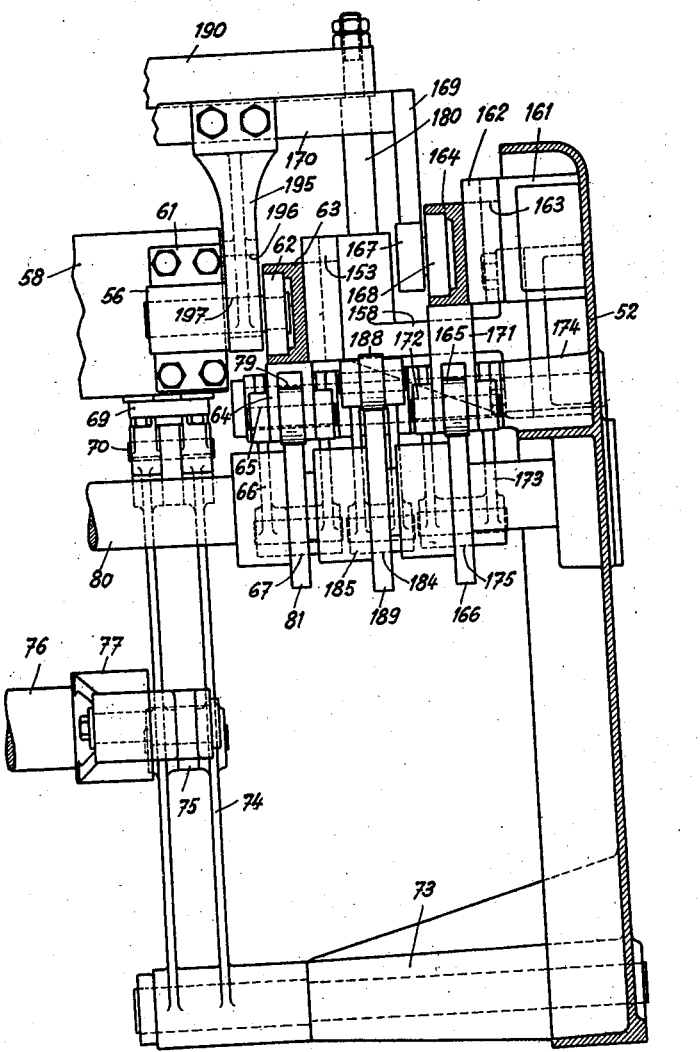

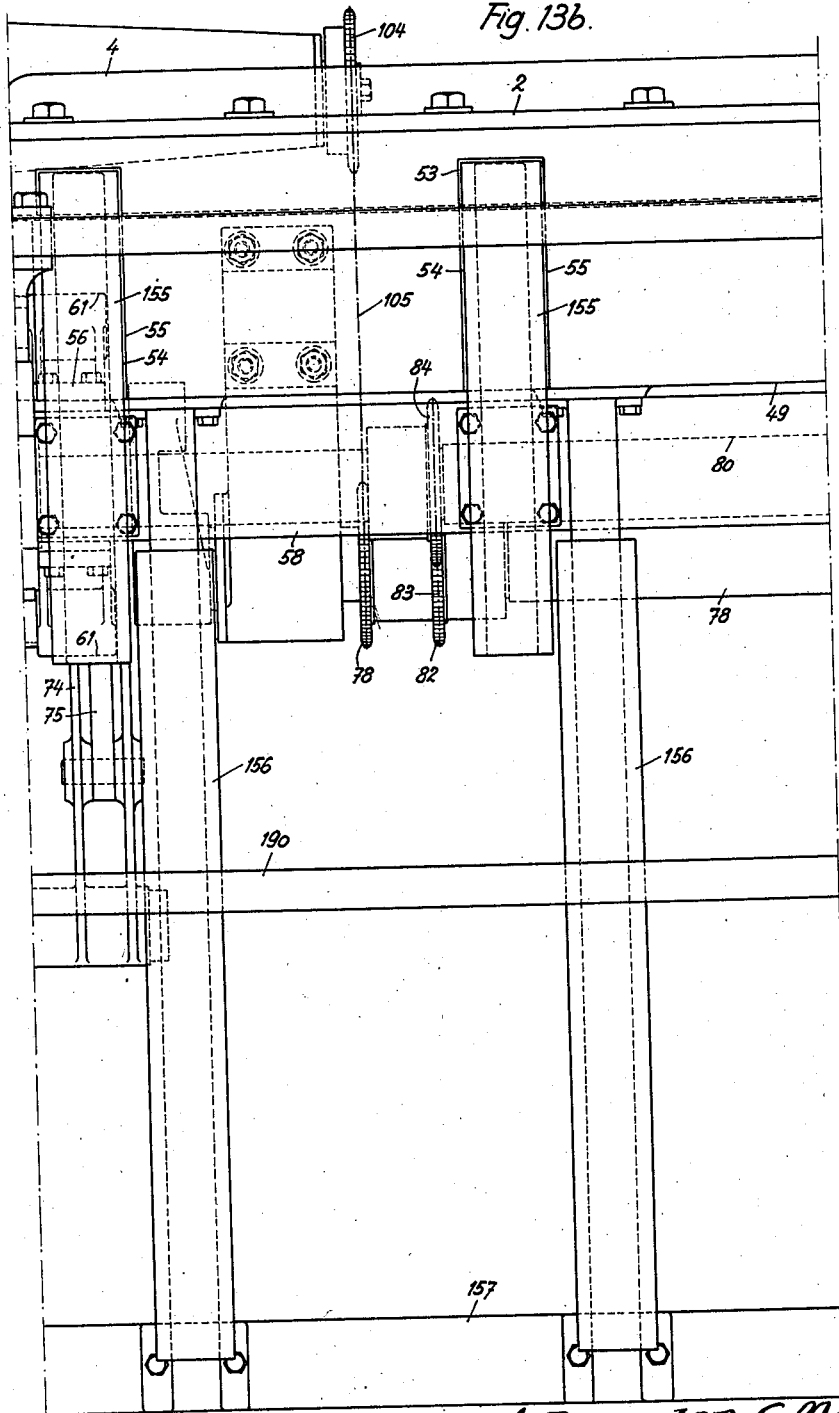

Patented Feb. 16, 1943

2,311,452

UNITED STATES PATENT OFFICE 2,311,452

CHARGING DEVICE

Gottfried Maurer, Zurich, Switzerland, assignor to A. Müller & Cie., Maschinenfabrik und Eisengiesserei, Aktiengesellschaft, Brugg, Switzerland, a joint-stock company of Switzerland Application April 1, 1942, Serial No. 437,292
In Germany February 22, 1941

17 Claims. (Cl. 164—48)

The object of the present invention is a charging device for a machine tool, specially but not exclusively for a clipping machine for cutting non-metals.

It is characterised by a movable support with holding means for the work pieces, this support leading the work pieces to the working place.

In a preferred embodiment a service table with holding means for the work pieces is provided, the movable support taking over the work pieces lying on the service table and leading them to the working place.

In a further preferred embodiment both the service table and the movable support have automatic holding means for the work pieces.

The embodiment with automatic holding means is particularly adapted for use in clippers for cutting veneers.

In the veneer clippers hitherto known, the veneer, on the working place, had to be placed by hand into the correct position, i. e., under the knife and the pressure beam. The clippers had to remain open until the piece cut was removed and the new piece to be cut inserted. However, as the stroke of the knife was comparatively small, it was, owing to difficult accessibility, very troublesome and dangerous for the worker to insert the work pieces and to put them into correct position at the working place. The result was that, with the clipping machines hitherto known, the lost or dead time was equal to 10 to 20 times the productive time.

These inconveniences are removed by using the automatic embodiment of this invention. Here, the worker places, without any risk, the work piece on to the easily accessible service table into the position necessary for cutting, while, in the meantime, the preceding work piece is conveyed by the movable support to the working place and, after cutting, conveyed away from the working place. The newly checked work piece is then likewise automatically taken over by the support and led to the working place. In this way, any danger whatever for the worker is avoided and the dead time of the clipping machine reduced to the smallest amount possible.

The accompanying drawings show, by way of example, two embodiments of the object of the invention, used as a charging device in an automatic clipping machine, specially for cutting veneers. In these drawings:

Figs. 1a, 1b, 1c are a plan view of the first embodiment, Fig. 1b partly in section, Figs. 2a, 2b, 2c are a front view in the direction of the arrows A in Figs. 1a and 1b.

Figs. 3a, 3b are a section along the line III—III in Fig. 1b.

Fig. 4 is a section along the line IV—IV in Fig. 2a.

Fig. 8 schematically shows the suction ventilator with the suction pipes leading to the suction channels.

Figure 6:
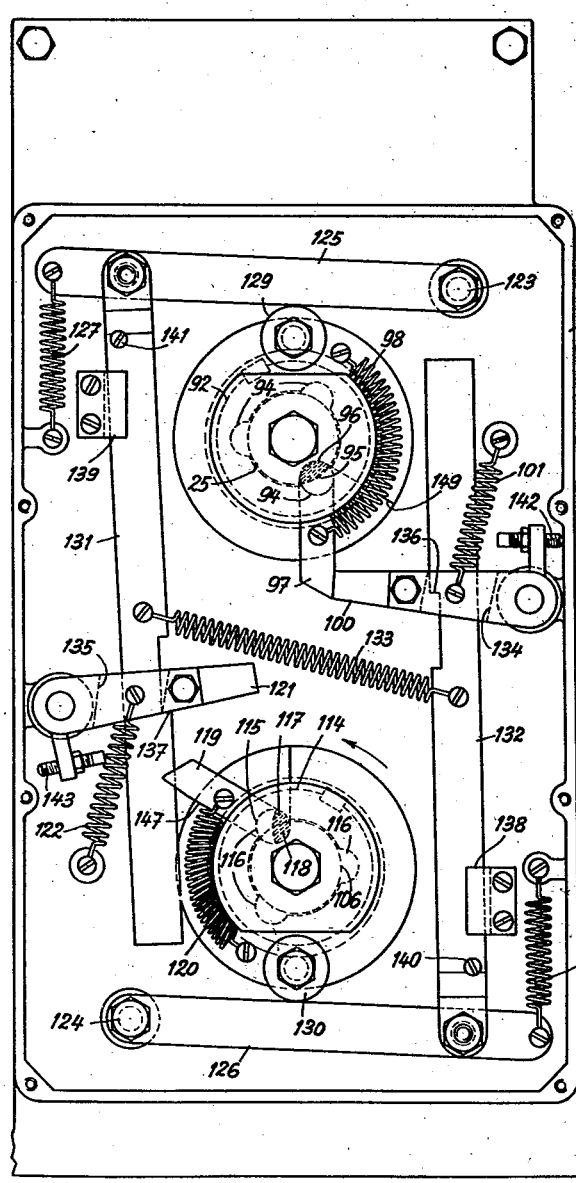
Fig. 6 shows the disengageable clutches for the charging carriage and clipper drive with their mutual control.
Figure 9:
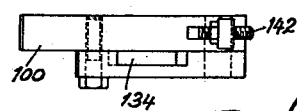

Fig. 9 shows a detail of Fig. 6.

Figs. 10a, 10b are a section corresponding to Fig. 3, but of a second embodiment.

Figure 11:
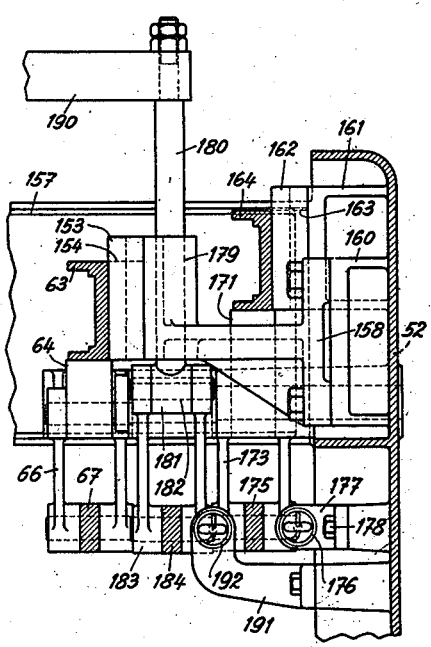

Fig. 11 is a section along the line XI—XI of Fig. 10a and

Fig. 12 is a front view from right to left in Fig. 10, partly in section.

Figure 13A:
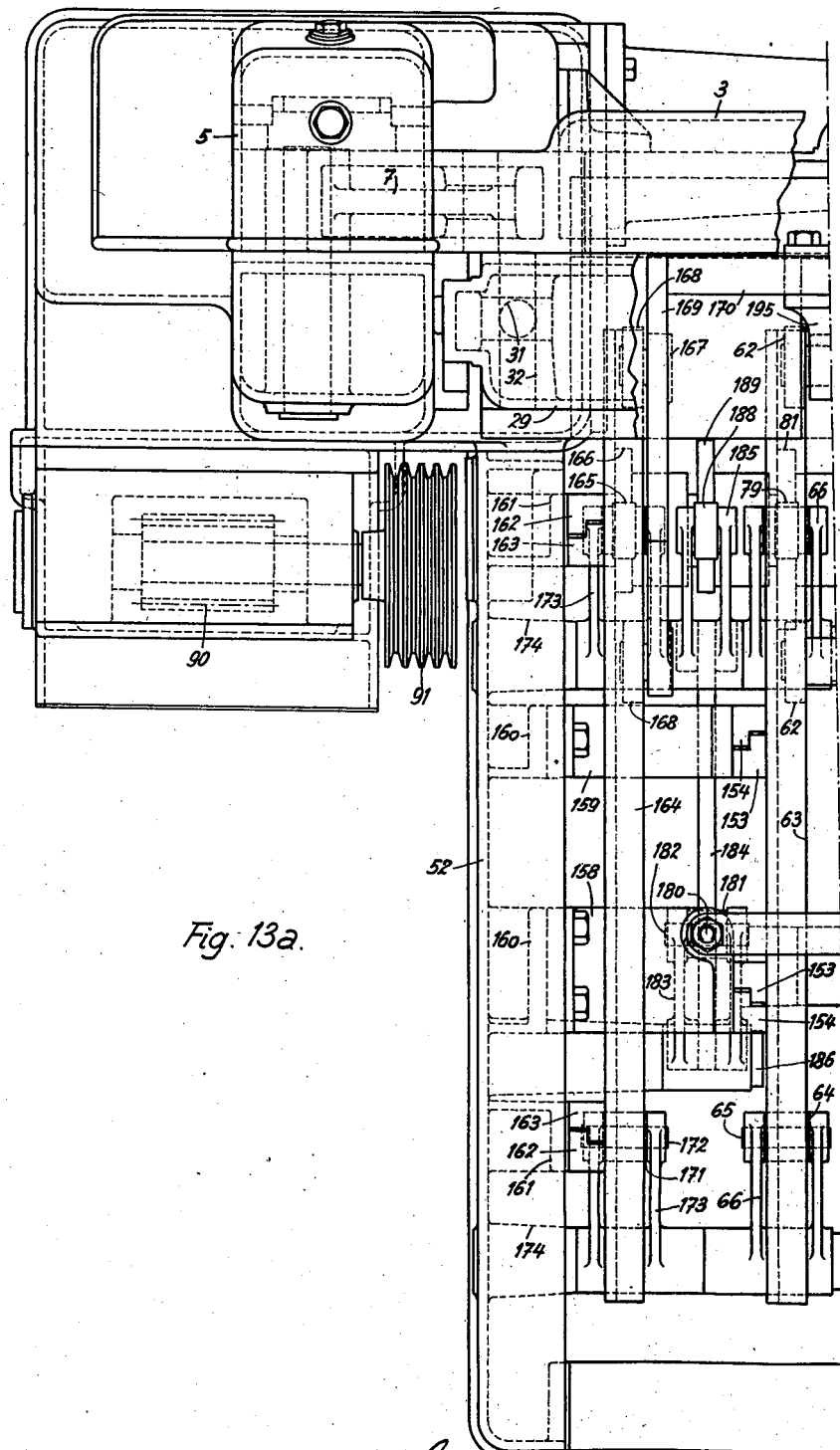

Figs. 13a, 13b are a plan view of the second embodiment, with parts removed.

The upper knife 1 and the lower knife 2 of the clipping machine are fixed to the movable knife holders 3 and 4 respectively. These holders are guided in the frame parts 5 and 6. The upper knife holder 3 is pivotally suspended on the frame parts 5 and 6 by means of the links 7, while the lower knife holder 4 is carried by the levers 11, 12 by means of the bolts 10. These levers are pivotally mounted on eyes 13 of the machine frame by means of eccentric pins 14. Motion is imparted to the knife holders 3 and 4 from the lever 15 by means of the rods 16, 17. These rods are pivotally fixed to the lever 15 by means of the bolts 18 and 19 respectively and to the holder 3 and lever 11 by means of the bolts 20 and 21 respectively. The lever 15 is revolvably placed on the bearings 23, 24 of the frame part 5 by means of the pivot 22 (Fig. 4). The lever 15 is driven by the crankshaft 25 and the crank rod 28 connecting the crank pin 26 (Fig. 4) with the bolt 27 of the lever 15.

In the frame parts 5 and 6 the pressure beam 29 is also guided. It serves the purpose of pressing the work piece to be cut, e. g. a veneer, towards the pressure table consisting of the bar 53 and the plates 54, and of holding it fast during cutting. This pressure beam 29 is carried by the rods 31 pivotally connected with the pressure beam by the bolts 32 and with the bent levers 34 and 35 respectively by the bolts 33. The bent lever 34 is mounted on the bearings 37, 38 of the frame part 5 by means of the shaft 36 (Fig. 4). Besides this, it carries a roller 39 by means of a bolt 41, the roller cooperating with a cam disc 40 attached to the crankshaft 25. The bent lever 35 is operated by the bent lever 34 with the aid of the rod 42 which is pivotally connected by bolts with the bent levers 34, 35. The spring 44 between the disc 45 and the sleeve 47 presses the roller 39 against the cam disc 40.

The clipping machine described above forms the object of a copending application by the inventor where it is disclosed in a very detailed manner.

Figure 3B:
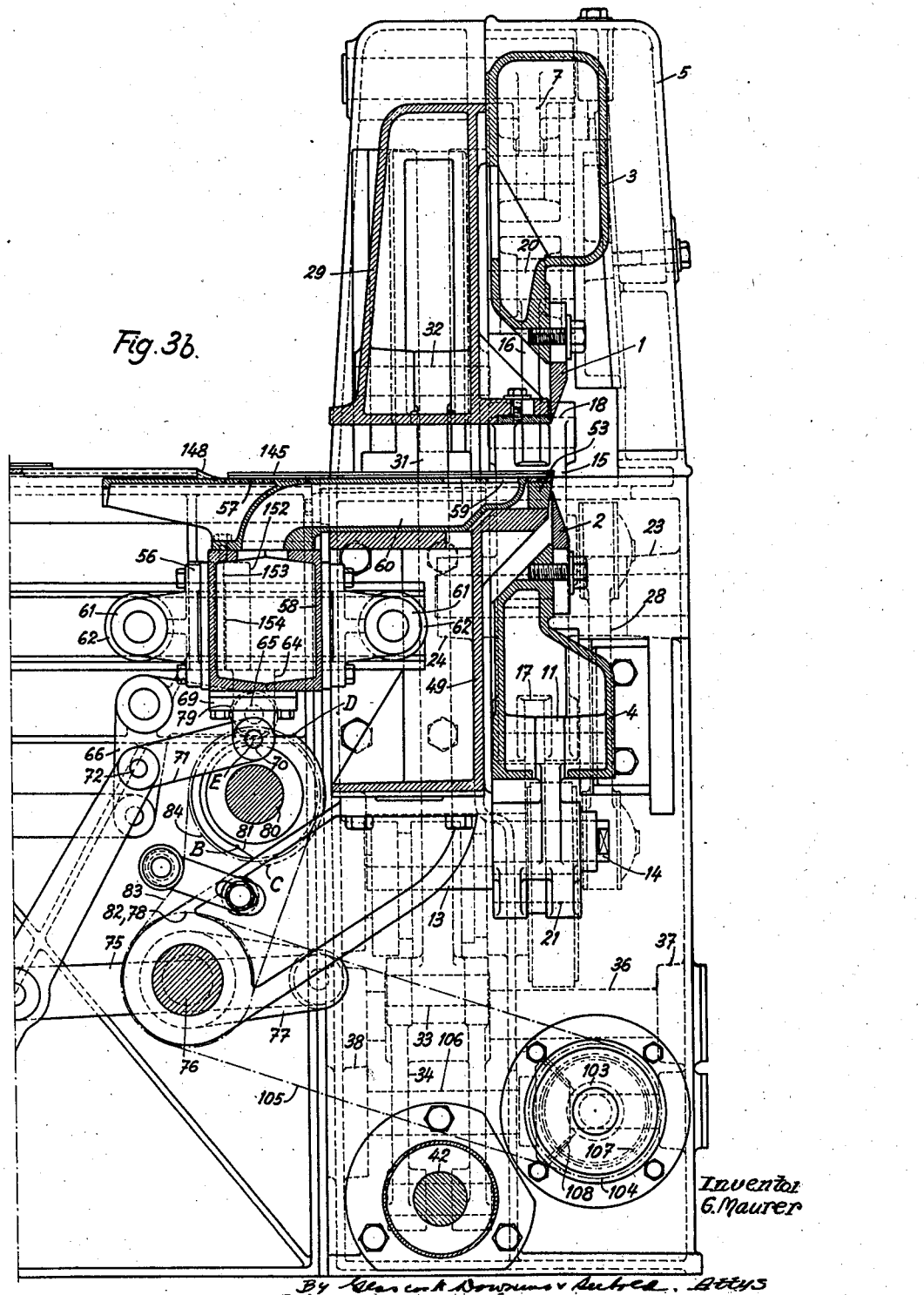
Figure 7:
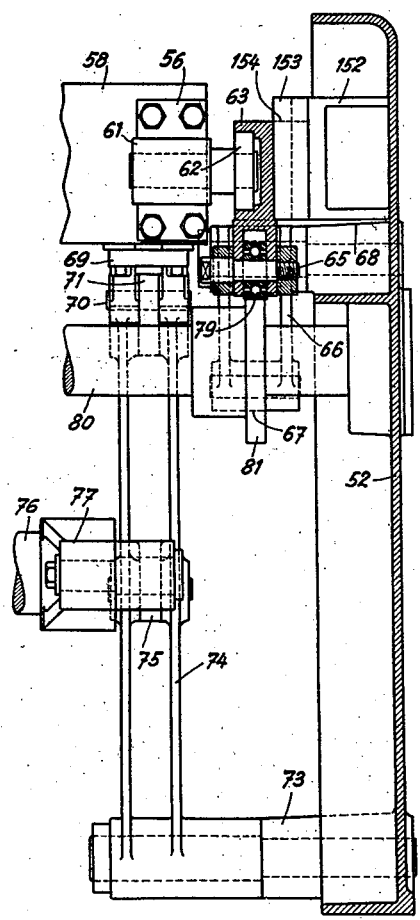
Fig. 7 is a front view of the vertical drive for the carriage, partly in section.

An embodiment exemplifying the present invention is, however, formed by the charging device leading the work pieces, e. g. the veneers, between the clipper knives 1 and 2 and by the mutual control of the clipper knives and of the charging device. This embodiment is described as follows:

The stationary service table on to which the work pieces are laid, consists of the hollow bars 48, which, at the one end, are fixed to the suction channel 51 and, at the other end, to the beam 49. The hollow interior spaces of these bars 48 form channels which, at the one end, run into the open air and, at the other end, are connected to the suction channel 51. The beam 49 and the suction channel 51 are fixed to the machine frame 52. The bars 48 forming the service table pass, at the sloping fore edge 148, over on to the pressure table consisting of the bar 53 and the plates 54. The bar 53 and the plates 54 are fixed to the beam 49 and form longitudinal slots 55. These slots 55 are adapted, in the right-hand position (Fig. 3b) of the carriage 56 forming the movable support, to receive the hollow bars 57 of the said carriage. These bars 57 are screwed fast to the box girder 58. The cavity 60 of the bars 57, at the one end, is in communication with the open air by the openings 59 and at the other end, it runs into the box girder 58 formed as a suction channel. The suction channels 51 and 58 are, as is schematically shown in Fig. 8, connected to the suction ventilator 144 by means of the suction pipes 150, 151, the suction ventilator producing a depression in the suction channels 51, 58. The suction pipe 151 is flexible, because the box girder 58 belonging to the carriage 56, moves to and fro. Four rollers 62 are fixed to the box girder 58 by means of the supports 61. These rollers 62 run on the rails 63 being suspended on the levers 66 by means of the eyes 64 and the bolts 65. The levers 66 are swingingly mounted on the eyes 68 of the machine frame 52 (Fig. 7). Those of the levers 66 belonging to the same rail are connected with each other by a rod 67 (Figs. 3a, 3b). The rails 63 are vertically guided on the machine frame 52 in the following manner (Figs. 1a, 1b, 1c): The angle irons 153 are screwed to the vertical flanges 152. These angles irons 153 engage the angle irons 154 screwed to the rails 63 and that with sufficient play in the direction parallel to the rails 63. To the brackets 69 screwed to the box girder 58 of the carriage 56 the links 71 are pivotally fixed by means of the bolts 70, the links, at the other end, being by means of the bolts 72 connected to the rocking levers 74 mounted on the bearing 73 of the machine frame 52. These rocking levers 74 are connected with the cranks 77 of the shaft 76 by means of the connecting rods 75. The shaft 76 is driven by means of the chain wheel 78. On the shaft 76 rotating, the cranks 77, by means of the rocking levers 74, impart a forward and backward motion to the carriage 56 on the rails 63. On the bolts 65, the rollers 79 are also positioned and adapted to cooperate with the cam discs 81 fixed to the shaft 80, allowing the cam discs to move the rails 63 and with them the carriage 56 up- and down-ward (see especially Fig. 7). The shaft 80 is driven by the shaft 76 with the aid of the chain wheel 82, chain 83 and chain wheel 84.

Figure 1A:
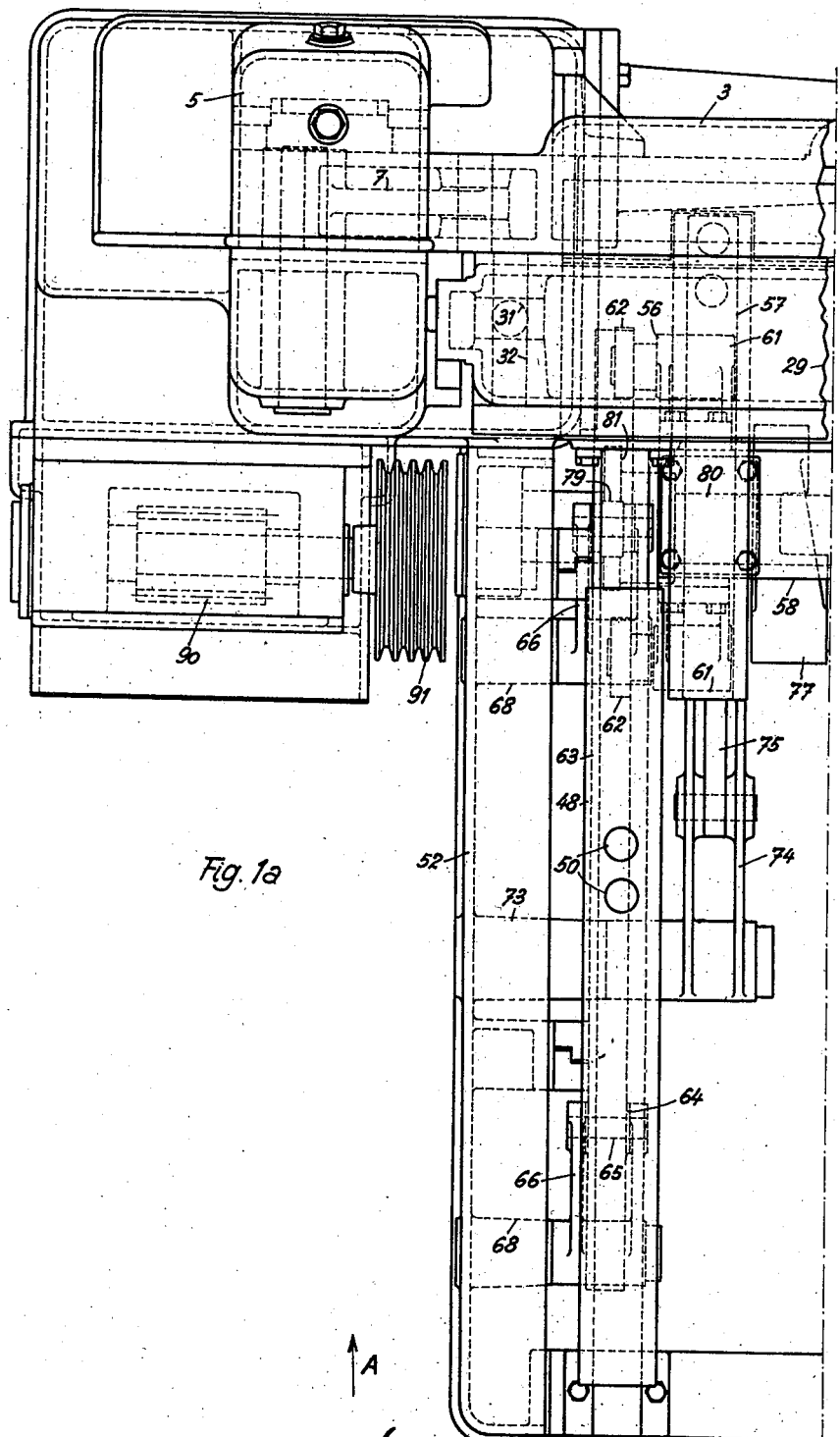
Figure 1C:
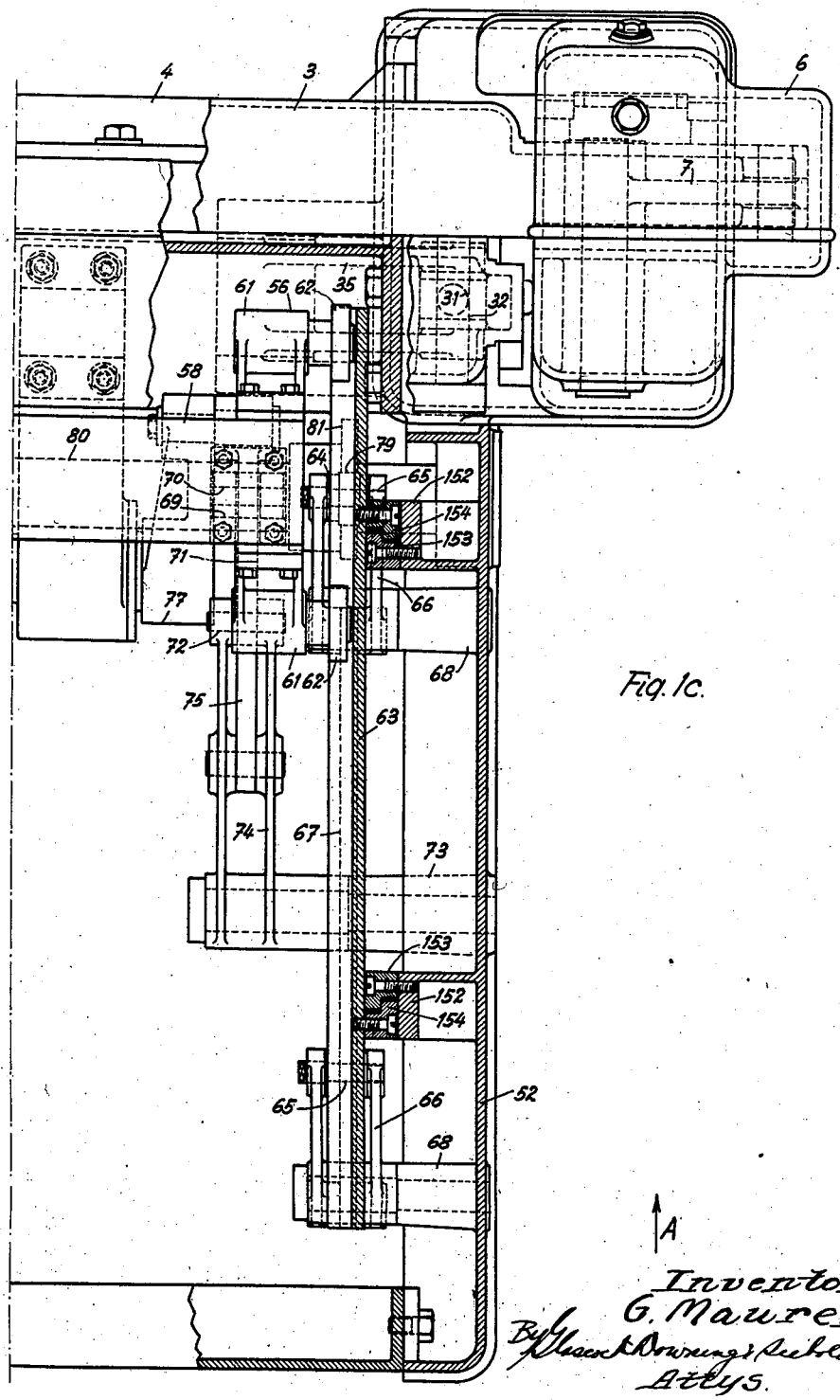
Figure 26:
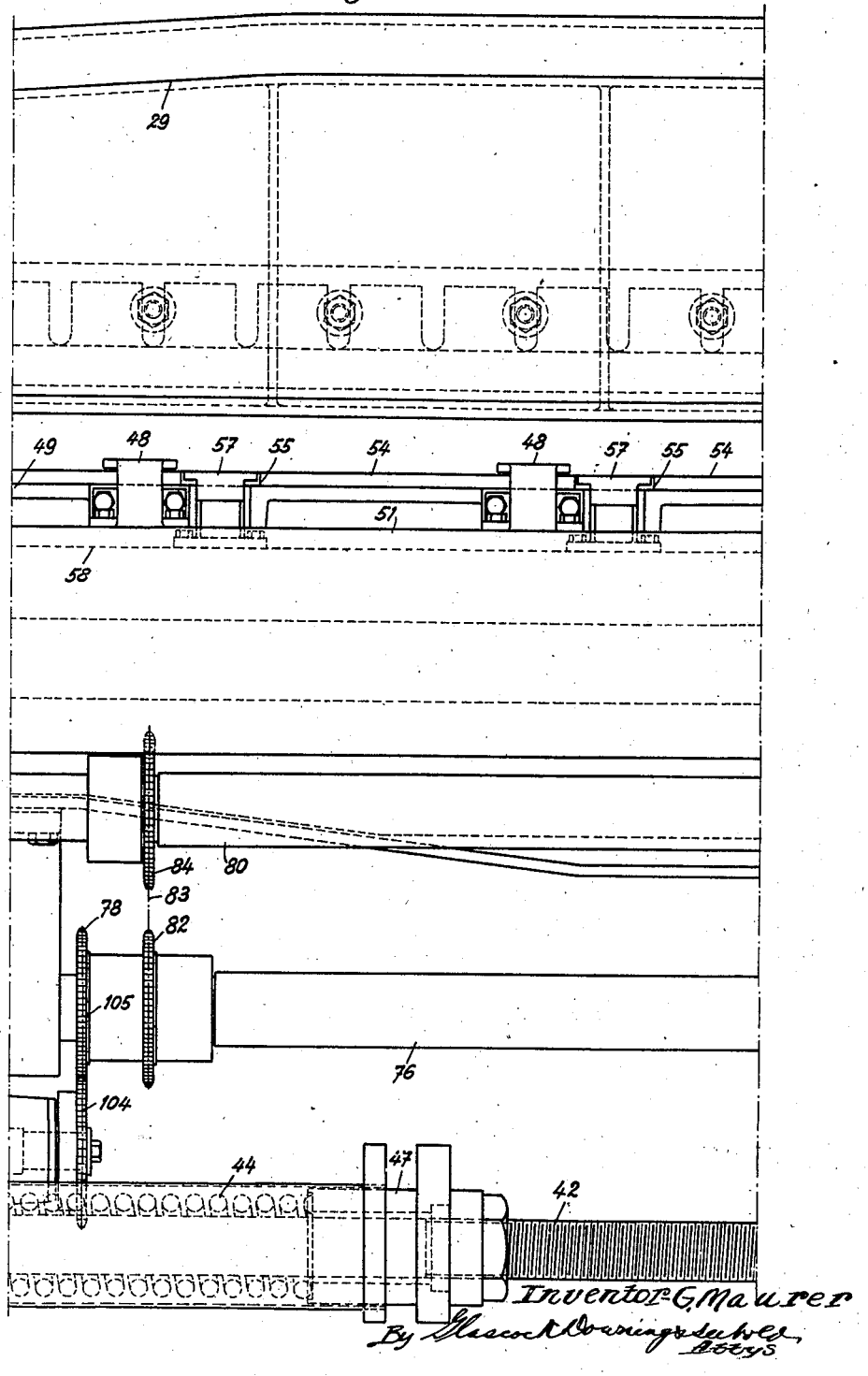
Figure 5:
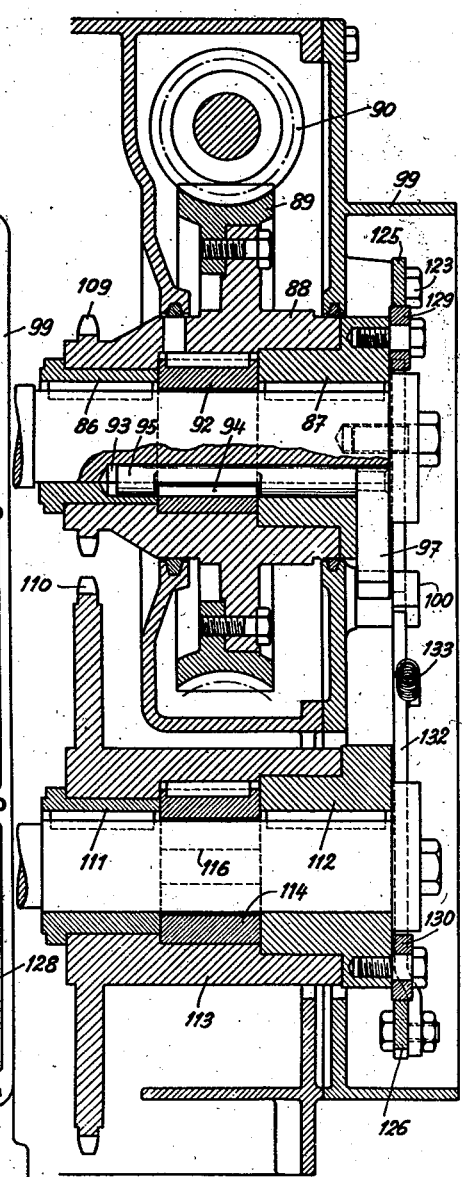
Fig. 5 shows the right part of Fig. 4, on an enlarged scale.

The drive of the clipper knives 1 and 2 and of the carriage 56 must take place in a definite mutual rhythm. The mechanism necessary for this purpose is described as follows, reference being especially had to Figs. 4, 5 and 6:

The crankshaft 25 runs on the ball bearings 85 mounted on the frame part 5. Bushings 86 and 87 are keyed on to the crankshaft 25. On these bushings the hub 88 of the worm wheel rim 89 engaging the driving worm 90 is loosely placed. The latter is driven by a non-illustrated prime mover and a cone belt drive through a belt pulley 91 (Figs. 1a and 2a). Loosely on the crankshaft 25, but keyed on to the hub 88 is a driving sleeve 92. The bushings 86 and 87 and the crankshaft 25 have a common bore 93 with its axis parallel to the crankshaft. The driving sleeve 92 has three grooves 94 (Fig. 6), whose radius is equal to that of the bore 93 and which, at each revolution of the idly running sleeve 92, are once in line with the bore 93. A rotatable pin 95 is placed in the bore 93 with running fit. This pin, within reach of the bushings 86, 87, is cylindrical, in reach of the driving sleeve 92, however, it has the hatched cross section 96 (Fig. 6). A pawl 97 is fixed to the pin 95 and is under the influence of a spring 98 fixed to the pawl and to a flange of the bushing 87. The pawl 97 may be operated by means of the lever 100 pivotally mounted on the clutch casing 99, a spring 101 fixed to the casing 99 acting upon said lever. A rod 132 cooperates with the lever 100, this rod being operated by a similar pin clutch described below, for the charging device.

The shaft 76 (Fig. 3b) is driven by the shaft 103 by means of the chain wheels 104 and 78 and the chain 105. The shaft 103, for its part, is driven by the shaft 106 (Figs. 3b, 4) with the aid of the bevel wheels 107, 108. The shaft 106 is driven by another pin clutch by the worm gear 89, 90, as follows:

A chain wheel 109 is provided on the hub 88 of the worm wheel 89, acting by means of a chain upon the chain wheel 110. Bushings 111, 112 are keyed on to the shaft 106 in a similar manner to the crankshaft 25, the hub 113 of the chain wheel 110 being loosely mounted on said bushings. Loosely on the shaft 106, but keyed on to the hub 113 is the driving sleeve 114. The remaining parts of this clutch are also quite equal to those of the first clutch: The bushings 111 and 112 have again a common bore 115 (only visible in Fig. 6). The driving sleeve 114 has the grooves 116, whose radius is equal to that of the bore 115 and which, at each revolution of the idly running sleeve 114 are once in line with the bore 115. As in the first clutch, the pin 117 placed in the bore 115, within reach of the bushings 111, 112 is cylindrical, and within reach of the driving sleeve 114, it has the hatched cross section 118 (Fig. 6). Here too, a pawl 119 is fixed to the pin 117 and is under the effect of a spring 120 fixed to this pawl and to a flange of the bushing 112. The pawl 119 is controlled by the lever 121 pivotally mounted on the clutch casing 99, a spring 122 fixed to the casing 99 acting upon said lever 121.

The mechanism for the mutual control of the two pin clutches is as follows (Fig. 6):

The levers 125, 126 are pivotally mounted on the clutch casing 99 by means of the bolts 123 and 124. They are under the influence of the springs 127, 128 fixed to the casing 99, the springs tending to press the levers 125, 126 against the rollers 129 and 130 mounted on the flanges of the bushings 87, 112. A rod 131 is pivotally connected to the lever 125 and a rod 132 to the lever 126. The two rods 131, 132 are interconnected by a spring 133. The lever 100 has a slot 134 (Fig. 9) and, likewise, the lever 121 has a slot 135 through which the rod 132 or 131 respectively passes. The rod 132 has a notch 136 adapted to cooperate with the lever 100 and the rod 131 a notch 137 adapted to cooperate with the lever 121. The plates 138, 139 screwed fast to the casing 99 serve as a stop for the screws 140, 141 fixed to the rods 131, 132 in order to limit the movements of the rods 131, 132 caused by the springs 127, 128, while the adjusting screws 142, 143 are destined for limiting the swinging movement of the levers 100 and 121 produced by the springs 101 and 122.

The manner of action of the illustrated charging device is as follows:

The suction ventilator 144 permanently produces a depression in the interior of the bars 48 and 57. Therefore, a permanent suction effect exists in the openings 50 and 59.

Suppose that the machine is in the position illustrated in the drawings. The pin clutches in Fig. 6 are in the position where the knives 1 and 2 of the clipping machine have just finished their opening movement, the knives are thus in the position shown in Fig. 3b. The work piece newly cut, e. g. a veneer 145, is constantly pressed against the bars 57 of the carriage 56 by the suction effect in the openings 59. During the time, when the veneer 145 has been conveyed between the knives 1 and 2 and has been cut by the same, the worker has laid a new veneer 146 to be cut on to the service table consisting of the bars 48. This veneer has then been pressed against the bars 48 by the suction effect in the openings 50, but only so much that the worker is enabled to move the veneer in order to place it into the position necessary for the desired cut. This position is indicated by non-illustrated marks or by hinged stops of the service table.

At the moment when the knives 1 and 2 are in the completely open position, the pin 95 of the clipper clutch is in the position shown in Fig. 6, i. e., the pawl 97 strikes against the lever 100. The pin part with the hatched cross section 96 lies thus completely in the bore of the crankshaft 25, i. e., it does not enter one of the grooves 94 of the driving sleeve 92. This means that the sleeve 92 runs idle and the crankshaft 25 and with it the knives 1 and 2 are at rest in the position shown in Fig. 3b. In this position of the pin clutch for the clipper, the roller 129 holds the lever 125 against the effect of the spring 127 in the upper position shown in Fig. 6, thereby the rod 131 holds the lever 121 in the position shown in Fig. 6. The pawl 119 bears against the stopping surface 147 of the flange of the bushing 112. The pin part with the hatched cross section 118 engages one of the grooves 116 of the driving sleeve 114 and is taken along together with the shaft 106 and the bushings 111, 112. Seen in Fig. 3b the cranks 77 are now driven in a clockwise direction by the shaft 106 with the aid of the bevel wheels 108, 107, shaft 103, chain wheels 104, 78 and the shaft 76. Seen in Fig. 3b, the cranks 77 move the carriage 56 with the veneer 145 with the aid of the connecting rods 75, the rocking levers 74 and the links 71 to the left. On the ascending fore edge 148 of the bars 48, the veneer 145, on the left-hand motion of the carriage 56 and against the suction effect in the openings 59, is lifted off from the carriage 56. When the carriage has arrived under the veneer 146 to be conveyed, the rollers 79 of the rails 63 and thereby the latter and the carriage 56 themselves are lifted when the rollers 79 engage the cam discs 81 between the points B and C (Fig. 3b). The surface of the bars 57 of the carriage 56 then lie over the surface of the bars 48 and the veneer 146, against the suction effect in the openings 50, is lifted off and, at the same time pressed against the bars 57 by the suction effect in the openings 59. Now, seen in Fig. 3b, the carriage 56, in its lifted position commences its right hand movement. When the rollers 79 come into contact with the cam disc 81 between the points D and E, they drop and with them also the carriage 56 until, in point E, the surface of the bars 57 lies in the plane of the surface of the bar 53 and of the plates 54. At this moment, the carriage 56 comes to a stop, as may be seen from the following description of Fig. 6;

After the pin clutch of the charging device has begun to rotate, starting from the position shown in Fig. 6, in an anticlockwise direction, the roller 130 has released the lever 126. This, under the influence of the spring 128, has swung in an anticlockwise direction and thereby lifted the rod 132, whose notch 136, under the influence of the spring 133, has jerked into operating position with the lever 100, i. e., into a position corresponding to that shown in Fig. 6 for the rod 131 and the lever 121. After about a ¾-revolution of the shaft 106 and, thereby, of the bushing 112, the roller 130 comes into contact with the rod 131 and swings the same in a clockwise direction, so that this rod 131 releases the lever 121. This, under the effect of the spring 122, rotates in a clockwise direction until the adjusting screw 143 strikes against the casing 99. Now, the lever 121 is within reach of the path of the pawl 119, i. e., in a position corresponding to that shown in Fig. 6 for the lever 100 of the clipper clutch. On further rotation of the shaft 106 and, thereby, of the bushing 112, the pawl 119 strikes against the lever 121 and, contrary to the effect of the spring 120 is swung in a clockwise direction, until the pin part with the hatched cross section 118 lies outside the groove 116 of the driving sleeve 114, that is, in a position corresponding to that shown in Fig. 6 for the pin 95 of the clipper clutch. Now the shaft 106 and, with it, the carriage 56 come to a stop. The shaft 106 has made one revolution and, as the transmission ratio between shafts 106 and 76 is 1:1, the crank 77 has also made an entire revolution, i. e., the carriage 56 is now again in the right-hand position shown in Fig. 3b, but now carries the veneer 146.

However, at the end of the above described movement of the shaft 106 and the bushing 112 the roller 130 has again reached the position shown in Fig. 6 and, thereby, contrary to the effect of the spring 128, has swung the lever 126 in a clockwise direction and in this way, drawn the rod 132 downward. This rod, as described before, now being in engagement with the lever 100, swings the latter in an anticlockwise direction. This lever 100 thereby releases the pawl 97. As long as none of the grooves 94 of the revolving driving sleeve 92 lie in reach of the pin 95, the pawl 97, in spite of its being released by the lever 100, remains in the position shown in Fig. 6. However, as soon as one of the grooves lies within reach of the pin, the pawl 97 and, with it, the pin 95, are turned in an anticlockwise direction under the influence of the spring 98, until the pawl 97 strikes against the stopping surface 149 of the flange of the bushing 87. Then the pin portion with the hatched cross section 96 has entered one of the grooves 94 of the driving sleeve 92 and is now taken along together with the crankshaft 25 and the bushings 86, 87. The pin 95 with its pawl 97 has thus a position corresponding to that of the pin 117 with the pawl 119 shown in Fig. 6. Now, by the rotation of the crankshaft 25, the pressure beam 29 is first brought into the lowest position by the cam disc 40, so that it presses the veneer 146 against the pressure table. After this, the veneer 146 is cut by the knives 1 and 2 driven by the crank rod 28 and the lever 15. At the moment when the shaft 25 and, with it, the bushing 87 has begun to rotate in an anticlockwise direction, the roller 129 has released the lever 125. This, under the influence of the spring 127, has revolved in an anticlockwise direction and moved the rod 131 downward, the notch 137 of which has thereby again been jerked, under the influence of the spring 133, into working position with the lever 121 which, contrary to its position shown in Fig. 6, is in a position corresponding to that shown in Fig. 6, but for the lever 100. After about a ¾-revolution of the shaft 25 and, with it, of the bushing 87, the roller 129 was in contact with the rod 132 and swung the same in a clockwise direction. Thereby the rod 132 has released the engaged lever 100 and this, under the effect of the spring 101, has rotated in a clockwise direction into the position shown in Fig. 6. On further rotation of the shaft 25 and, with it, of the bushing 87, the pawl 97 has struck against the lever 100 and was, contrary to the effect of the spring 98, swung in a clockwise direction until the pin portion with the hatched cross section 96 was outside the groove 94 of the driving sleeve 92, that is, into the position shown in Fig. 6, in which the shaft 25 is at rest and the knives are again in the position shown in Fig. 36. However, at the end of the above-described movement of the shaft 25 and the bushing 87, the roller 129 has again reached the position shown in Fig. 6 and has, thereby and contrary to the effect of the spring 127, swung the lever 125 in a clockwise direction and drawn the rod 131 upward. However, this rod, as above described, being in engagement with the lever 121, swings the latter in an anticlockwise direction into the position shown in Fig. 6 and, in this way, releases the pawl 119. So long as none of the grooves 116 of the revolving driving sleeve 114 lie within reach of the pin 117, the pawl 119, in spite of being released by the lever 121, remains in the position hitherto taken. However, as soon as one of the grooves lies within reach of the pin, the pawl 119 and with it the pin 117, under the influence of the spring 120, is swung into the position shown in Fig. 6. Now the shaft 106 begins to rotate again and the carriage 56 recommences its movement, i. e., the two clutches are again in the position shown in Fig. 6 and the whole described cycle begins anew.

In Figs. 10a to 13 a second embodiment is illustrated, differing from the first in that the work pieces are no longer pressed against their base by suction air, but by pressure bars. This embodiment comes principally into question, if several work pieces lying one above the other, e. g. bundles of veneers, are to be cut, because, in this case, suction air, which only sucks the lowest piece, cannot be used.

In Figs. 10a to 13 the second example is only shown in so far as it differs from the first and the description is also restricted to these differences. Figs. 11 and 12 only show the one side of the machine. The other, non-illustrated side is, as regards the parts described below, constructed symmetrically.

The carriage 56 is constructed in a like manner as before, with the difference, however, that the bars 155 are no longer hollow. The same is the case with the bars 156 forming the service table, which, at the one end, are fixed to the beam 157 and, at the other end, to the beam 49 of the machine frame 52. Here too the carriage 56 runs on the rails 63, which are suspended on the levers 66 and guided vertically in a like manner. However, here the angle irons 153 of the vertical guide are fixed to supports 158, 159 which, on their part, are screwed to cast-on brackets 160 of the machine frame 52. The drive for the horizontal movement of the carriage is the same as in the first example. Here too, it is produced by the shaft 76 with the aid of the cranks 77, connecting rods 75, rocking levers 74 and links 71. The vertical movement of the carriage and thus of the rails 63 is also obtained in the same manner as in the first example by the shaft 80 with the aid of the cam discs 81 and the rollers 79 mounted on the bolts 65 fixed to the rails 63.

To the cast-on brackets 161, of the frame 52, the angle irons 162 are vertically screwed, which are in such a way in engagement with angle irons 163 fixed to the rails 164 that the rails 164 are free to move vertically.

These rails 164 are suspended on the levers 173 by means of the eyes 171 and the bolts 172. The levers 173 are swingingly mounted on the eyes 174 of the machine frame 52. The levers 173 belonging to the same rail 164 are interconnected by a rod 175. Furthermore, rollers 165 are provided on the bolts 172, cooperating with cam discs 166 fixed to the shaft 80 in order to move the rails 164 up and downward. In order that these rollers 165 be permanently pressed against the cam discs 166, springs 176 act upon the levers 173 seen in Fig. 10a, these springs at the other end being fixed by means of the screws 178 to the brackets 177 screwed to the frame 52. On these rails 164 runs a carriage 167 by means of its rollers 168. It has two arms 169 carrying a pressure bar 170 extending over more than the whole width of the carriage 56 and having a slight downward deflection. Drivers 195 are screwed to this pressure bar 170, having a vertical slot 196 through which the wheel axles 197 of the carriage 56 pass with sliding seat, so that, on the backward and forward motion of the carriage 56, the carriage 167 is also taken along by the drivers 195 but is free to move independent of the carriage 56 in a vertical direction.

The immovable supports 158 have vertical bores 179 through which supporting bolts 180 pass with sliding seat. The supporting bolts 180 carry a pressure bar 190 extending over the whole width of the service table and being slightly bent downward. At their lower end these supporting bolts carry eyes 181 with a bore through which bolts 182 pass, to which levers 183 are pivotally fixed. These levers 183 are connected with the levers 185 by means of the rods 184. The levers 183 and 185 are pivotally mounted on the machine frame 52 by means of the bolts 186 and 187 respectively. The levers 185 carry rollers 188 cooperating with cam discs 189 and in this way moving the pressure bar 190 up- and downward on the spot. Springs 192 acting upon the levers 185 and being fixed to the bracket 191 of the machine frame 52 press the rollers 188 permanently against the cam discs 189.

The shaft 80 with the several cam discs and the shaft 25 for the clipper knives 1 and 2, whose drive is exactly the same as in the first example, are controlled with exactly the same pin clutches and in the same rhythm as in the first embodiment.

The manner of action of the pressure bars 170 and 190 is as follows (Figs. 10a, 10b):

In the position shown in Figs. 10a, 10b, the knives 1 and 2 are again, as in Fig. 3b, in a completely open position. They are at rest. The carriage 56 is in its foremost position. The pressure bar 170 presses the work pieces, e. g. the bundle of veneers 193, against the pressure table. The pressure bar 190 is in a lifted position. The worker has already put a new bundle of veneers 194 on to the service table and has brought it in line with the non-illustrated mark or has struck it against the hinged stops not shown.

Now, the carriage 56, driven by the cranks 77, commences its movement to the left and by means of the drivers 195 takes the carriage 167 along with the pressure bar 170 at the same speed. The shaft 80 revolves in a clockwise direction. The rollers 188, at the beginning of the movement making contact with the cam discs 189 at F, begin to drop until, at the point G, they reach the smallest radius of the discs 189. Therefore, between F and G the pressure bar 190 sinks and presses the bundle of veneers 194 against the service table. From the point G onward, but now on the cam discs 166, the rollers 172 begin to ascend. The pressure bar 170 decreases its pressure and at the point H it is entirely lifted off from the bundle of veneers 193 and this latter has already run over the ascending fore end 148 upon the service table and can be taken away. The pressure bar 170 remains in the lifted position up to the point J of the cam discs 166 and, in this period, lies over the service table about in the position shown in dotted lines. Now it recommences to drop, while from the point K of the cam discs 189 onwards, the pressure bar 190 begins to rise. From the point K onwards, but on the cam discs 81, also the carriage 56, being now under the service table, commences to rise, thereby lifting off the bundle of veneers 194 from the service table. At the beginning of the right-hand movement of the carriages 56 and 167 the pressure of the dropping pressure bar 170 against the bundle of veneers 194 is already greater than the pressure of the rising pressure bar 190 and the bar 170 presses the bundle 194 against the bars 155 of the carriage.

At L the carriage 56 and the bar 170, being in pressing position, drop simultaneously by the same amount and at M the carriage 56 comes to a stop and the clippers cut the bundle of veneers and afterwards the knives are re-opened. Now, the position of the whole shown in Figs. 10a, 10b is again reached. During this cycle, the pin clutches worked in the same manner as was described in the first example.

It is understood that the details and arrangements of the single parts may be changed without falling beyond the scope of the invention. For instance other driving means than shown may be used.

The service table may, e. g., be omitted. Then the disengageable clutches will be made in such a way that the carriage forming the movable support will, seen in Fig. 3a in the left-hand dead centre remain at rest for a certain time until the worker has laid the work piece direct on to the carriage and brought it into the correct position.

In all embodiments, both with and without a service table, the movable support might even be operated by hand.

What I claim is:

1. In a charging device for a machine tool, a frame, a stationary service table on said frame, adapted to receive work pieces, a support movably mounted on said frame, adapted to take the work pieces over from said service table and to lead them to a working place, holding means adapted to hold the work pieces fast on said service table until they are taken over by said support, and other holding means in connection with said support, adapted to hold the work pieces fast on said support when they are led towards the working place.

2. In a charging device for a machine tool, a frame, a stationary service table on said frame, adapted to receive work pieces, a support movably mounted on said frame, adapted to take the work pieces over from said service table and to lead them to a working place, automatically operated holding means adapted to hold the work pieces fast on said service table until they are taken over by said support, and other automatically operated holding means in connection with said support, adapted to hold the work pieces fast on said support when they are led towards the working place.

3. In a charging device for a machine tool, a frame, a stationary service table on said frame, adapted to receive work pieces, an automatically operated support movably mounted on said frame, adapted to take the work pieces over from said service table and to lead them to a working place, automatically operated holding means adapted to hold the work pieces fast on said service table until they are taken over by said support, and other automatically operated holding means in connection with said support, adapted to hold the work pieces fast on said support when they are led towards the working place.

4. In a charging device for a machine tool, a frame, a stationary service table on said frame, adapted to receive work pieces, a support movably mounted on said frame, adapted to take the work pieces over from said service table and to lead them to a working place, a drive adapted to move said support from said service table towards the working place and from the working place towards said service table, another drive adapted to move said support in such a way that its supporting surface for the work pieces changes from a position below the supporting surface of said service table into a position above the supporting surface of said service table and vice versa, automatically operated holding means adapted to hold the work pieces fast on said service table until they are taken over by said support, and other automatically operated holding means in connection with said support, adapted to hold the work pieces fast on said support when they are led towards the working place.

5. In a charging device for a machine tool, a frame, a stationary service table on said frame, adapted to receive work pieces, a support movably mounted on said frame, adapted to take the work pieces over from said service table and to lead them to a working place, a drive adapted to move said support from said service table towards the working place and from the working place towards said service table, another drive adapted to move said support in such a way that its supporting surface for the work pieces changes from a position below the supporting surface of said table into a position above the supporting surface of said service table and vice versa, suction means on said service table adapted to hold the work pieces fast on said service table until they are taken over by said support, and other suction means on said support, adapted to hold the work pieces fast on said support when they are led towards the working place.

6. In a charging device for a machine tool, a frame, a stationary service table on said frame, adapted to receive work pieces, a support movably mounted on said frame, adapted to take the work pieces over from said service table and to lead them to a working place, a drive adapted to move said support from said service table towards the working place and from the working place towards said service table, another drive adapted to move said support in such a way that its supporting surface for the work pieces changes from a position below the supporting surface of said table into a position above the supporting surface of said service table and vice versa, and a suction ventilator, said support and said service table comprising hollow bars forming the supporting surfaces for the work pieces and further forming suction channels ending at the one end, in the open air on the supporting surfaces and, at the other end, being connected with said suction ventilator.

7. In a charging device for a machine tool, a frame, a stationary service table on said frame, adapted to receive work pieces, a support movably mounted on said frame, adapted to take the work pieces over from said service table and to lead them to a working place, a drive adapted to move said support from said service table towards the working place and from the working place towards said service table, another drive adapted to move said support in such a way that its supporting surface for the work pieces changes from a position below the supporting surface of said service table into a position above the supporting surface of said service table and vice versa, an automatically controlled pressure bar adapted to move to and fro together with said support and to hold the work pieces fast on said support when they are led towards the working place, and another automatically controlled pressure bar adapted to hold the work pieces fast on said service table until they are taken over by said support.

8. In an automatic clipping machine, a frame, clipper knives mounted on said frame, a disengageable shaft to drive said clipper knives, a stationary service table on said frame, adapted to receive work pieces, a support movably mounted on said frame, adapted to take the work pieces over from said service table and to lead them to said clipper knives, another disengageable shaft to drive said support, a first disengaging clutch adapted to engage and disengage said disengageable shaft, a second disengaging clutch to engage and disengage said other disengageable shaft, said first and said second clutch being adapted to control each other in a prescribed rhythm, automatically operated holding means adapted to hold the work pieces fast on said service table until they are taken over by said support, and other automatically operated holding means in connection with said support, adapted to hold the work pieces fast on said support when they are led towards said clipper knives.

9. In an automatic clipping machine, a frame, clipper knives mounted on said frame, a disengageable shaft to drive said clipper knives, a stationary service table on said frame, adapted to receive work pieces, a support movably mounted on said frame, adapted to take the work pieces over from said service table and to lead them to said clipper knives, another disengageable shaft to drive said support, a first disengaging clutch adapted to control said disengageable shaft, a second disengaging clutch to control said other disengageable shaft, each of said clutches comprising a driven part and a revolvable pin mounted on said driven part and adapted to be controlled by the other clutch, automatically operated holding means adapted to hold the work pieces fast on said service table until they are taken over by said support, and other automatically operated holding means in conection with said support, adapted to hold the work pieces fast on said support when they are led towards said clipper knives.

10. In a charging device for a machine tool, a frame, a stationary service table on said frame, adapted to receive work pieces, a first support movably mounted on said frame, adapted to take the work pieces over from said service table and to lead them to a working place, a drive adapted to move said first support from said service table towards the working place and from the working place towards said service table, another drive adatped to move said first support in such a way that its supporting surface for the work pieces changes from a position below the supporting surface of said service table into a position above the supporting surface of said service table and vice versa, an automatically controlled pressure bar to hold the work pieces fast on said support when they are led towards the working place, a second movable support carrying said pressure bar and being connected in such a way with said first movable support that both supports carry out the same forward and backward motion at the same time, their vertical motion however, independent of each other, and another automatically controlled pressure bar adapted to hold the work pieces fast on said service table until they are taken over by said first support.

11. In a charging device for a machine tool, a frame, a stationary service table on said frame, adapted to receive work pieces, a support movably mounted on said frame, adapted to take the work pieces over from said service table and to lead them to a working place, a crank drive adapted to move said support from said service table towards the working place and from the working place towards said service table, a cam disc adapted to move said support in such a way that its supporting surface for the work pieces changes from a position below the supporting surfaces of said service table into a position above the supporting surface of said service table and vice versa, automatically operated holding means adapted to hold the work pieces fast on said service table until they are taken over by said support, and other automatically operated holding means in connection with said support, adapted to hold the work pieces fast on said support when they are led towards the working place.

12. In a charging device for a machine tool, a frame, a stationary service table on said frame, adapted to receive work pieces, a first support movable mounted on said frame, adapted to take the work pieces over from said service table and to lead them to a working place, a crank drive adapted to move said first support from said service table towards the working place and from the working place towards said service table, a cam disc adapted to move said first support in such a way that its supporting surface for the work pieces changes from a position below the supporting surface of said service table into a position above the supporting surface of said service table and vice versa, an automatically controlled pressure bar to hold the work pieces fast on said support when they are led towards the working place, a second movable support carrying said pressure bar and being connected in such a way with said first movable support that both supports carry out the same forward and backward motion at the same time, their vertical motion, however, independent of each other, another cam disc to move said second movable support vertically, and another automatically controlled pressure bar adapted to hold the work pieces fast on said service table until they are taken over by said first support.

13. In a charging device for a machine tool, a frame, a stationary service table on said frame, adapted to receive work pieces, a support movably mounted on said frame, adapted to take the work pieces over from said service table and to lead them to a working place, a drive adapted to move said support from said service table towards the working place and from the working place towards said service table, another drive adapted to move said support in such a way that its supporting surface for the work pieces changes from a position below the supporting surface of said service table into a position above the supporting surface of said service table and vice versa, an automatically controlled slightly and downwardly curved pressure bar adapted to move to and fro together with said support and to hold the work pieces fast on said support when they are led towards the working place, and another automatically controlled slightly and downwardly curved pressure bar adapted to hold the work pieces fast on said service table until they are taken over by said support.

14. In an automatic clipping machine, a frame, clipper knives mounted on said frame, a disengageable shaft to drive said clipper knives, a stationary service table on said frame, adapted to receive work pieces, a support movably mounted on said frame, adapted to take the work pieces over from said service table and to lead them to a working place, another disengageable shaft to drive said support, a first disengaging clutch adapted to engage and disengage said disengageable shaft, a second disengaging clutch to engage and disengage said other disengageable shaft, said first and said second clutch being adapted to control each other in such a way that said clipper knives, in their open position, are at rest for some time, while said support is at rest during cutting, automatically operated holding means adapted to hold the work pieces fast on said service table until they are taken over by said support, and other automatically operated holding means in connection with said support, adapted to hold the work pieces fast on said support when they are led towards said clipper knives.

15. In a charging device for a machine tool, a frame, a stationary service table on said frame, adapted to receive work pieces, rails mounted on said frame with allowance for vertical movement, a support comprising rollers, movably arranged on said rails by means of said rollers and adapted to take the work pieces over from said service table and to lead them to a working place, a crank drive adapted to move said support from said service table towards the working place and from the working place towards said service table, a cam disc adapted to move said rails in such a way that the supporting surface of said support changes from a position below the supporting surface of said service table into a position above the supporting surface of said service table and vice versa, automatically operated holding means adapted to hold the work pieces fast on said service table until they are taken over by said support, and other automatically operated holding means in connection with said support, adapted to hold the work pieces fast on said support when they are led towards the working place.

16. In a charging device for a machine tool, a frame, a stationary service table on said frame, adapted to receive work pieces, first rails mounted on said frame with allowance for vertical movement, a first support comprising first rollers, movably arranged on said first rails by means of said first rollers and adapted to take the work pieces over from said service table and to lead them to a working place, a drive adapted to move said first support from said service table towards the working place and from the working place towards said service table, a first cam disc adapted to move said first rails in such a way that the supporting surface of said first support changes from a position below the supporting surface of said service table into a position above the supporting surface of said service table and vice versa, a pressure bar to hold the work pieces fast on said support when they are led towards the working place, second rails mounted on said frame with allowance for vertical movement, a second support comprising second rollers, movably arranged on said second rails, said second support carrying said pressure bar and being connected in such a way with said first movable support that both supports carry out the same forward and backward motion at the same time, their vertical motion however, independent of each other, a second cam disc adapted to move said second rails vertically, and another automatically controlled pressure bar adapted to hold the work pieces fast on said service table until they are taken over by said support.

17. In a charging device for a machine tool, a frame, a stationary service table on said frame, adapted to receive work pieces, a hand-operated support movably mounted on said frame, adapted to take the work pieces over from said service table and to lead them to a working place, holding means adapted to hold the work pieces fast on said service table until they are taken over by said support, and other holding means in connection with said support, adapted to hold the work pieces fast on said support when they are led towards the working place.

GOTTFRIED MAURER.